United States Patent
Edwards

(10) Patent No.: US 11,153,819 B2
(45) Date of Patent: Oct. 19, 2021

(54) BATTERY CONTROL FOR SAFEGUARDING LOWER VOLTAGE INTEGRATED CIRCUITS

(71) Applicant: Itron Networked Solutions, Inc., San Jose, CA (US)

(72) Inventor: Bruce Edwards, San Jose, CA (US)

(73) Assignee: ITRON NETWORKED SOLUTIONS, INC., San Jose, CA (US)

(*) Notice: Subject to any disclaimer, the term of this patent is extended or adjusted under 35 U.S.C. 154(b) by 462 days.

(21) Appl. No.: 15/889,502

(22) Filed: Feb. 6, 2018

(65) Prior Publication Data

US 2018/0227849 A1    Aug. 9, 2018

Related U.S. Application Data

(60) Provisional application No. 62/455,134, filed on Feb. 6, 2017.

(51) Int. Cl.
| | | |
|---|---|---|
| H02J 7/34 | (2006.01) | |
| H04W 52/02 | (2009.01) | |
| H02J 7/00 | (2006.01) | |
| H04W 84/18 | (2009.01) | |

(52) U.S. Cl.
CPC ....... H04W 52/0216 (2013.01); H02J 7/0063 (2013.01); H02J 7/342 (2020.01); H04W 52/0296 (2013.01); H04W 84/18 (2013.01); Y02D 30/70 (2020.08)

(58) Field of Classification Search
CPC .......... H04W 52/0216; H04W 52/0296; H02J 7/0063; H02J 7/342
USPC .................................................. 320/103, 116
See application file for complete search history.

(56) References Cited

U.S. PATENT DOCUMENTS

| | | | | |
|---|---|---|---|---|
| 3,594,627 A | * | 7/1971 | Lesher | H02J 7/022 320/103 |
| 3,683,256 A | * | 8/1972 | Mas | H02J 7/00719 320/129 |
| 3,787,704 A | * | 1/1974 | Dennewitz | H05B 41/325 315/241 P |
| 3,963,976 A | * | 6/1976 | Clark | H02J 7/008 320/139 |
| 4,039,898 A | * | 8/1977 | Iwata | H05B 41/32 315/241 P |

(Continued)

OTHER PUBLICATIONS

"Internal resistance of D Cell Alkaline versus vs AA—NiMH ?", lineijbaldj, CandlePowerForums, Published online Aug. 17, 2007 to Sep. 4, 2007, Seen Online Feb. 23, 2021, https://www.candlepowerforums.com/vb/showthread.php?172428-Internal-resistance-of-D-Cell-Alkaline-versus-vs-AA-NiMH (Year: 2007).*

(Continued)

*Primary Examiner* — John T Trischler
(74) *Attorney, Agent, or Firm* — Artegis Law Group, LLP

(57) ABSTRACT

A battery controller buffers a higher voltage provided by a primary cell in order to charge a secondary cell that operates at a lower voltage. The battery controller includes a storage device that is charged by the primary cell. When the voltage of the storage device reaches a threshold, the battery controller conducts the stored charge into the secondary cell while isolating the secondary cell from the primary cell. The secondary cell, when charged, powers a node that operates with a low voltage.

21 Claims, 4 Drawing Sheets

(56) References Cited

U.S. PATENT DOCUMENTS

| | | | | |
|---|---|---|---|---|
| 4,187,536 A | * | 2/1980 | Govaert | H02M 3/33507 363/21.17 |
| 4,477,764 A | * | 10/1984 | Pollard | B60L 1/14 320/116 |
| 4,672,293 A | * | 6/1987 | Crampton | H02J 9/062 307/66 |
| 5,383,907 A | * | 1/1995 | Kroll | A61N 1/3956 607/5 |
| 5,407,444 A | * | 4/1995 | Kroll | H01M 16/00 607/5 |
| 5,440,179 A | * | 8/1995 | Severinsky | H02J 9/062 307/64 |
| 5,447,522 A | * | 9/1995 | Chang | A61N 1/3925 607/4 |
| 5,488,283 A | * | 1/1996 | Dougherty | B60L 58/19 307/10.1 |
| 5,592,067 A | * | 1/1997 | Peter | H02J 7/0018 320/103 |
| 5,620,464 A | * | 4/1997 | Kroll | A61N 1/3956 607/5 |
| 6,064,176 A | * | 5/2000 | Odaka | H02J 7/00047 320/106 |
| 6,153,947 A | * | 11/2000 | Rockow | H02J 7/0024 307/64 |
| 6,271,642 B1 | * | 8/2001 | Dougherty | G08B 29/181 320/104 |
| 6,310,789 B1 | * | 10/2001 | Nebrigic | H02J 2207/20 363/60 |
| 6,320,351 B1 | * | 11/2001 | Ng | H02J 7/0032 320/104 |
| 6,713,894 B1 | * | 3/2004 | Reimer | B60L 50/40 307/10.1 |
| 6,737,830 B2 | * | 5/2004 | Bean | H02J 7/345 320/125 |
| 6,777,916 B2 | * | 8/2004 | Yang | H02J 7/345 320/146 |
| 6,864,664 B2 | * | 3/2005 | Clift | H02J 7/342 320/128 |
| 6,873,133 B1 | * | 3/2005 | Kavounas | H02J 7/345 320/103 |
| 6,909,915 B2 | * | 6/2005 | Greatbatch | H02J 7/342 607/5 |
| 7,020,519 B2 | * | 3/2006 | Greatbatch | H01M 6/16 607/5 |
| 7,030,591 B2 | * | 4/2006 | Stellberger | H02J 7/0031 320/134 |
| 7,079,893 B2 | * | 7/2006 | Greatbatch | H01M 10/0525 607/5 |
| 7,109,684 B2 | * | 9/2006 | Takaoka | H02J 7/0071 320/132 |
| 7,136,701 B2 | * | 11/2006 | Greatbatch | A61N 1/378 607/5 |
| 7,193,390 B2 | * | 3/2007 | Nagai | H01M 10/44 320/103 |
| 7,199,488 B1 | * | 4/2007 | Baker | H02J 13/00024 307/43 |
| 7,200,357 B2 | * | 4/2007 | Janik | G11B 27/10 455/3.02 |
| 7,277,417 B2 | * | 10/2007 | Palm | H04W 74/02 370/338 |
| 7,298,113 B2 | * | 11/2007 | Orikasa | H02J 7/0031 320/112 |
| 7,550,943 B2 | * | 6/2009 | Spartano | H02J 1/00 320/107 |
| 7,573,154 B2 | * | 8/2009 | Tsui | H02J 7/342 307/42 |
| 7,660,601 B2 | * | 2/2010 | Janik | G06F 1/1632 320/137 |
| 7,977,923 B2 | * | 7/2011 | Pelrine | H02N 11/002 320/166 |
| 7,994,756 B2 | * | 8/2011 | Rowland | H02J 7/0016 320/166 |
| 8,004,237 B2 | * | 8/2011 | Manor | H02J 7/342 320/114 |
| 8,228,645 B2 | * | 7/2012 | English | H02H 7/008 307/109 |
| 8,243,701 B2 | * | 8/2012 | Palm | H04W 74/02 370/338 |
| 8,259,221 B1 | * | 9/2012 | Kaplan | H04N 5/232411 348/372 |
| 8,525,520 B2 | * | 9/2013 | Edwards | G01R 31/3648 324/429 |
| 8,553,666 B2 | * | 10/2013 | Palm | H04W 74/02 370/338 |
| 8,749,213 B2 | * | 6/2014 | Chen | H02M 3/1584 323/267 |
| 8,803,683 B2 | * | 8/2014 | Schnitz | G08C 17/02 340/539.13 |
| 8,970,388 B2 | * | 3/2015 | Track | H02J 7/0063 340/636.1 |
| 9,025,582 B2 | * | 5/2015 | Palm | H04W 74/02 370/338 |
| 9,048,669 B2 | * | 6/2015 | Lim | H02J 7/0019 |
| 9,217,765 B2 | * | 12/2015 | Lazar, II | G01R 31/50 |
| 9,244,474 B2 | * | 1/2016 | Smith | G08B 17/10 |
| 9,380,531 B1 | * | 6/2016 | Subramanian | H04W 52/0216 |
| 9,490,653 B2 | * | 11/2016 | Shevde | H02J 7/045 |
| 9,529,076 B2 | * | 12/2016 | Subramanian | G01S 5/10 |
| 9,612,602 B2 | * | 4/2017 | Smith | G08B 21/18 |
| 9,692,260 B2 | * | 6/2017 | Walsh | H02J 7/025 |
| 9,694,192 B2 | * | 7/2017 | Vansickle | A61N 1/3787 |
| 9,706,489 B2 | * | 7/2017 | Subramanian | H04W 52/02 |
| 9,710,001 B2 | * | 7/2017 | Smith | G06F 1/3203 |
| 9,731,610 B2 | * | 8/2017 | Reichow | B60L 50/15 |
| 9,809,126 B2 | * | 11/2017 | Nakazawa | B60L 11/1868 |
| 9,955,456 B2 | * | 4/2018 | Hui | H04B 1/7156 |
| 9,958,885 B2 | * | 5/2018 | Smith | G08B 25/08 |
| 9,964,973 B2 | * | 5/2018 | Smith | G06F 1/3203 |
| 10,028,220 B2 | * | 7/2018 | Subramanian | H04W 52/0219 |
| 10,075,007 B2 | * | 9/2018 | Langlinais | H02J 7/0068 |
| 10,236,554 B2 | * | 3/2019 | Ackley | H01Q 1/2225 |
| 10,320,290 B2 | * | 6/2019 | Peker | H02M 3/156 |
| 10,382,080 B2 | * | 8/2019 | Turnbull | H04B 1/3822 |
| 10,476,382 B2 | * | 11/2019 | Wu | H02J 7/342 |
| 10,485,537 B2 | * | 11/2019 | Yates | H02J 7/0068 |
| 10,541,541 B2 | * | 1/2020 | Zhang | H02J 7/0014 |
| 10,554,057 B1 | * | 2/2020 | Wang | H02J 7/0029 |
| 10,608,962 B2 | * | 3/2020 | Edwards | H04L 49/1584 |
| 2001/0028571 A1 | * | 10/2001 | Hanada | H02J 7/345 363/50 |
| 2003/0001544 A1 | * | 1/2003 | Nakanishi | B60L 50/16 320/162 |
| 2003/0099121 A1 | * | 5/2003 | Yang | H02J 7/345 363/125 |
| 2004/0004462 A1 | * | 1/2004 | Bean | H02J 7/345 320/128 |
| 2004/0147971 A1 | * | 7/2004 | Greatbatch | A61N 1/378 607/34 |
| 2004/0147972 A1 | * | 7/2004 | Greatbatch | H01M 6/5033 607/34 |
| 2004/0158296 A1 | * | 8/2004 | Greatbatch | H01M 16/00 607/34 |
| 2004/0218620 A1 | * | 11/2004 | Palm | H04W 74/02 370/445 |
| 2004/0225333 A1 | * | 11/2004 | Greatbatch | H01M 6/5033 607/34 |
| 2004/0257039 A1 | * | 12/2004 | Clift | H02J 7/342 320/128 |
| 2004/0257043 A1 | * | 12/2004 | Takaoka | H02J 7/00716 320/132 |
| 2005/0017688 A1 | * | 1/2005 | Stellberger | H03K 17/6874 320/134 |
| 2005/0052154 A1 | * | 3/2005 | Kavounas | H02J 7/345 320/116 |
| 2005/0088138 A1 | * | 4/2005 | Sasaki | H02J 2207/20 320/101 |
| 2005/0127871 A1 | * | 6/2005 | Orikasa | H01M 6/5033 320/112 |

(56) References Cited

U.S. PATENT DOCUMENTS

| | | | | |
|---|---|---|---|---|
| 2005/0151518 | A1* | 7/2005 | Schneiker | H05B 45/37 323/222 |
| 2005/0250449 | A1* | 11/2005 | Janik | H04L 67/00 455/41.3 |
| 2008/0019344 | A1* | 1/2008 | Palm | H04W 74/02 370/338 |
| 2008/0079393 | A1* | 4/2008 | Spartano | H02J 1/00 320/110 |
| 2008/0111517 | A1* | 5/2008 | Pfeifer | H02J 7/35 320/101 |
| 2008/0197801 | A1* | 8/2008 | Manor | H02J 7/342 320/103 |
| 2008/0278221 | A1* | 11/2008 | Rowland | H02J 7/345 327/536 |
| 2010/0060231 | A1* | 3/2010 | Trainor | H01M 10/465 320/103 |
| 2010/0114235 | A1* | 5/2010 | Jiang | H01M 6/5033 607/34 |
| 2010/0127658 | A1* | 5/2010 | Fazakas | H02J 7/022 320/101 |
| 2010/0226049 | A1* | 9/2010 | English | H02H 7/008 361/15 |
| 2010/0308654 | A1* | 12/2010 | Chen | H02M 3/1588 307/31 |
| 2011/0298414 | A1* | 12/2011 | Manor | H02J 7/342 320/103 |
| 2012/0086390 | A1* | 4/2012 | Lim | H02J 7/0019 320/107 |
| 2012/0269107 | A1* | 10/2012 | Palm | H04W 52/0203 370/311 |
| 2012/0297104 | A1* | 11/2012 | Thottuvelil | H02J 1/00 710/305 |
| 2013/0181829 | A1* | 7/2013 | Schnitz | G06Q 10/08 340/539.1 |
| 2013/0286914 | A1* | 10/2013 | Palm | H04W 52/0203 370/311 |
| 2013/0297082 | A1* | 11/2013 | Ensworth | G05B 19/18 700/284 |
| 2013/0320767 | A1* | 12/2013 | Huang | H01L 31/02021 307/77 |
| 2014/0046534 | A1* | 2/2014 | Lazar, II | G01R 31/52 701/33.9 |
| 2014/0103734 | A1* | 4/2014 | Walsh | H04W 52/10 307/104 |
| 2014/0232190 | A1* | 8/2014 | Chen | H02M 3/1588 307/31 |
| 2014/0252866 | A1* | 9/2014 | Walsh | H01F 38/14 307/104 |
| 2014/0268945 | A1* | 9/2014 | Low | H02M 3/07 363/60 |
| 2014/0347194 | A1* | 11/2014 | Schnitz | G01F 23/0061 340/870.05 |
| 2014/0368160 | A1* | 12/2014 | Reichow | B60L 50/15 320/107 |
| 2015/0008867 | A1* | 1/2015 | Smychkovich | H02J 7/00 320/107 |
| 2015/0021993 | A1* | 1/2015 | Smith | G08B 17/117 307/26 |
| 2015/0021997 | A1* | 1/2015 | Smith | G08B 17/10 307/38 |
| 2015/0022026 | A1* | 1/2015 | Smith | G08B 25/08 307/151 |
| 2015/0022349 | A1* | 1/2015 | Smith | H02J 1/06 340/539.22 |
| 2015/0022368 | A1* | 1/2015 | Smith | H02J 1/06 340/693.3 |
| 2016/0043762 | A1* | 2/2016 | Turnbull | H04B 1/3822 700/17 |
| 2016/0104374 | A1* | 4/2016 | Ypma | G07C 9/00182 340/5.25 |
| 2016/0111907 | A1* | 4/2016 | Lynds | B60L 58/12 320/134 |
| 2016/0150501 | A1* | 5/2016 | Hui | H04W 4/06 370/254 |
| 2016/0216362 | A1* | 7/2016 | Subramanian | H04W 56/001 |
| 2016/0219505 | A1* | 7/2016 | Subramanian | H04W 74/085 |
| 2016/0219516 | A1* | 7/2016 | Subramanian | H04W 52/0219 |
| 2017/0257023 | A1* | 9/2017 | Wu | H02J 50/001 |
| 2017/0279275 | A1* | 9/2017 | Yamamoto | H02J 7/35 |
| 2018/0226697 | A1* | 8/2018 | Edwards | H01M 6/14 |
| 2018/0324696 | A1* | 11/2018 | Subramanian | H04W 52/0219 |
| 2019/0214845 | A1* | 7/2019 | Hausman, Jr. | H02J 7/35 |
| 2020/0120513 | A1* | 4/2020 | Cahill-O'Brien | H04W 40/04 |
| 2020/0120575 | A1* | 4/2020 | Cahill-O'Brien | H04W 40/10 |

OTHER PUBLICATIONS

"Nickel Metal Hydride (NiMH): Handbook and Application Manual", Energizer Brands LLC, pp. 2 & 6, Published 2018, Seen online Feb. 23, 2021 data.energizer.com/pdfs/nickelmetalhydride_appman.pdf (Year: 2018).*

"Alkaline Manganese Dioxide: Handbook and Application Manual", Energizer Brands, pp. 6-10 esp.8, published 2018, seen online Feb. 23, 2021 data.energizer.com/pdfs/alkaline_appman.pdf (Year: 2018).*

* cited by examiner

BATTERY CONTROL FOR SAFEGUARDING LOWER VOLTAGE INTEGRATED CIRCUITS

CROSS-REFERENCE TO RELATED APPLICATIONS

This application claims the benefit of United States provisional patent application titled, "Battery Voltage Management," filed on Feb. 6, 2017 and having Ser. No. 62/455,134. The subject matter of this related application is hereby incorporated herein by reference.

BACKGROUND OF THE INVENTION

Field of the Invention

Embodiments of the present invention relate generally to wireless network communications and, more specifically, to battery control for safeguarding lower voltage integrated circuits.

Description of the Related Art

A conventional wireless mesh network includes a plurality of nodes configured to communicate with one another. In certain types of heterogeneous wireless mesh networks, both continuously-powered nodes and battery-powered nodes communicate and interact with one another within the mesh network. Typically, continuously-powered nodes are coupled to a power grid and have continuous access to power (except during power outages). Battery-powered nodes, on the other hand, have only a finite supply of battery power. To conserve power, battery-powered nodes may deactivate for long periods of time, during which little power is consumed, and then reactivate for short periods of time, during which very brief network communications are performed.

In many cases, battery-powered nodes are deployed in locations where replacing depleted batteries is difficult or impossible. For this reason, battery-powered nodes are preferably equipped with batteries having an extended lifetime. One example of a battery with an extended lifetime is a lithium thionyl chloride (LTC) battery. LTC batteries, however, typically cannot be used to power battery-powered nodes for at least two reasons.

First, LTC batteries usually deliver a voltage level that is higher than the maximum operating voltage of the integrated circuitry within a conventional battery-powered node. Consequently, powering a conventional battery-powered node using an LTC battery may damage or destroy the integrated circuitry. Second, LTC batteries oftentimes cannot deliver a sufficiently high current level quickly enough for the battery-powered node to perform network communications during the short reactivation periods. In fact, LTC batteries can be damaged by large current draws, such as those typically needed during the short reactivation periods.

As the foregoing illustrates, what is needed in the art is a more effective way to power battery-powered nodes using batteries that operate at high voltages.

SUMMARY OF THE INVENTION

One embodiment of the present invention sets forth a computer-implemented method for powering a battery-powered node residing within a wireless mesh network, including storing first electrical energy in a storage element, wherein a primary cell transmits the first electrical energy to the storage element at a first voltage level, determining that a second voltage level associated with the storage element exceeds a third voltage level associated with a secondary cell, and storing second electrical energy that is derived from the first electrical energy in the secondary cell, wherein the battery-powered node communicates with one or more other nodes residing within the wireless mesh network using at least a portion of the second electrical energy.

At least one advantage of the techniques described herein is that a higher voltage battery (including an LTC battery) can safely power a battery-powered node that has a lower maximum operating voltage. Accordingly, the battery-powered node may operate for an extended period of time compared to conventional battery-powered nodes powered only by lower voltage batteries.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

As discussed above, battery-powered nodes included in conventional mesh networks may be deployed in locations where replacing depleted batteries is difficult or impossible. Accordingly, battery-powered nodes are preferably equipped with batteries having an extended lifetime, such as LTC batteries. LTC batteries, however, typically deliver a voltage level that exceeds the maximum voltage level associated with most conventional battery-powered nodes. Further, LTC batteries cannot quickly provide the high current level that is needed when a conventional battery-powered node reactivates to perform network communications.

To address these issues, embodiments of the invention include a battery controller that buffers a higher voltage provided by a primary cell in order to charge a secondary cell. The secondary cell provides a low voltage that can safely power a battery-powered node with limited risk of damage. The secondary cell may also have a low impedance and therefore be capable of providing the elevated current level needed during reactivation of the battery-powered node.

One advantage of the techniques described herein is that a higher voltage battery (including an LTC battery) can safely power a battery-powered node that has a lower maximum operating voltage. Accordingly, the battery-powered node may operate for an extended period of time compared to conventional battery-powered nodes powered only by lower voltage batteries. Extending the operational life of battery-powered nodes that participate in wireless mesh networks is critical to the ongoing operation of those networks. Another advantage of the techniques described herein is that the primary cell is not required to quickly provide an elevated current level when the battery-powered node reactivates because the secondary cell provides this current level. Thus, the battery-powered node can very briefly reactivate to perform network communications, thereby conserving power. For these reasons, the techniques described herein represent a technological advancement over previous approaches.

System Overview

Figure 1:
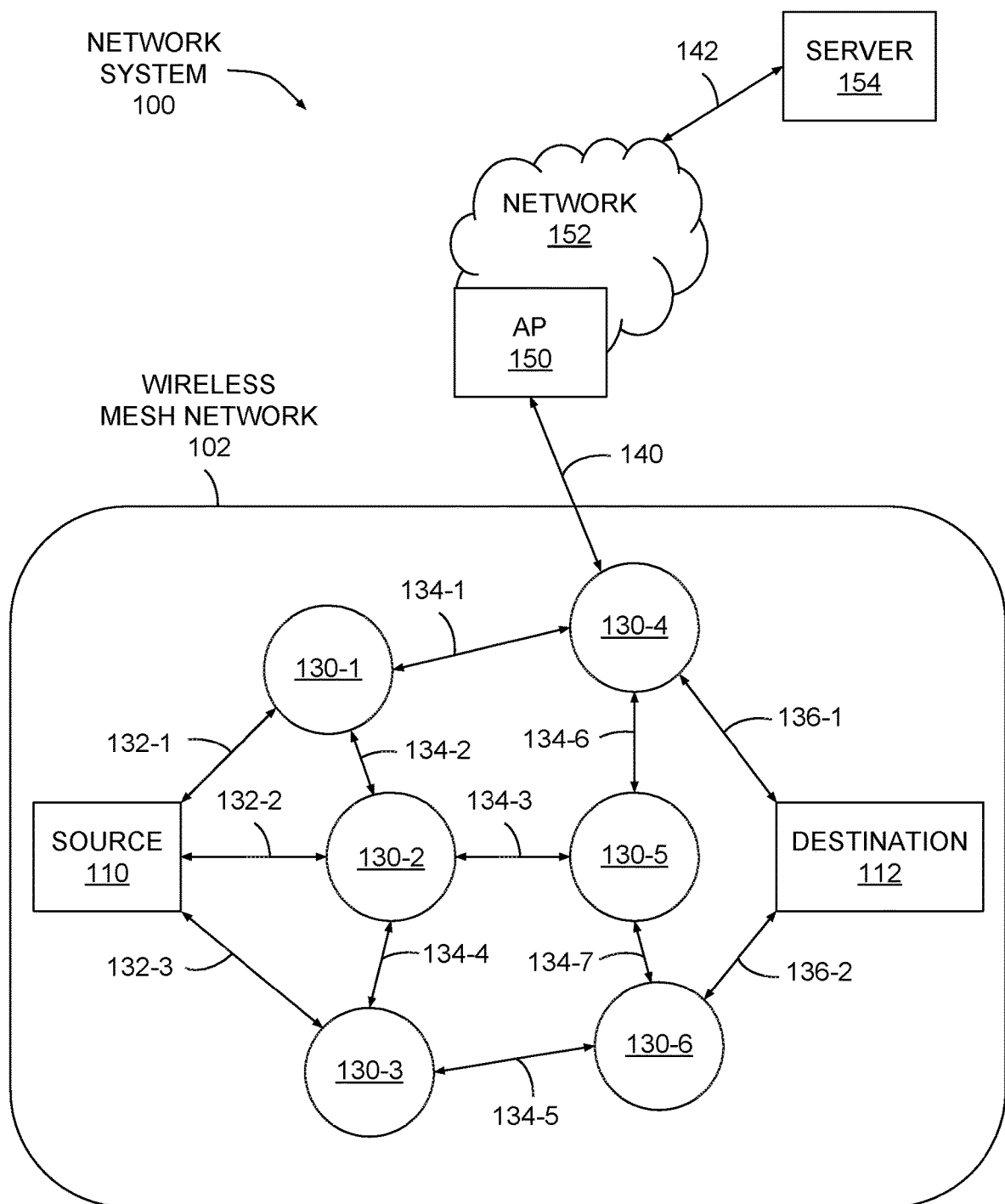
FIG. 1 illustrates a network system configured to implement one or more aspects of the present invention.

FIG. 1 illustrates a network system configured to implement one or more aspects of the present invention. As shown, the network system 100 includes a wireless mesh network 102, which may include a source node 110, intermediate nodes 130 and destination node 112. The source node 110 is able to communicate with certain intermediate nodes 130 via communication links 132. The intermediate nodes 130 communicate among themselves via communication links 134. The intermediate nodes 130 communicate with the destination node 112 via communication links 136. The network system 100 may also include an access point 150, a network 152, and a server 154. Any of the elements within network system 100 may be continuously powered and coupled to a power grid or battery powered and including one or more internal batteries.

A discovery protocol may be implemented to determine node adjacency to one or more adjacent nodes. For example, intermediate node 130-2 may execute the discovery protocol to determine that nodes 110, 130-1, 130-3, and 130-5 are adjacent to node 130-2. Furthermore, this node adjacency indicates that communication links 132-2, 134-2, 134-4 and 134-3 may be established between the nodes 110, 130-1, 130-3, and 130-5, respectively. Any technically feasible discovery protocol may be implemented without departing from the scope and spirit of embodiments of the present invention.

The discovery protocol may also be implemented to determine the hopping sequences of adjacent nodes, i.e. the sequence of channels across which nodes periodically receive payload data. As is known in the art, a "channel" may correspond to a particular range of frequencies. Once adjacency is established between the source node 110 and at least one intermediate node 130, the source node 110 may generate payload data for delivery to the destination node 112, assuming a path is available. The payload data may comprise an Internet protocol (IP) packet, or any other technically feasible unit of data. Similarly, any technically feasible addressing and forwarding techniques may be implemented to facilitate delivery of the payload data from the source node 110 to the destination node 112. For example, the payload data may include a header field configured to include a destination address, such as an IP address or media access control (MAC) address.

Each intermediate node 130 may be configured to forward the payload data based on the destination address. Alternatively, the payload data may include a header field configured to include at least one switch label to define a predetermined path from the source node 110 to the destination node 112. A forwarding database may be maintained by each intermediate node 130 that indicates which communication link 132, 134, 136 should be used and in what priority to transmit the payload data for delivery to the destination node 112. The forwarding database may represent multiple routes to the destination address, and each of the multiple routes may include one or more cost values. Any technically feasible type of cost value may characterize a link or a route within the network system 100, although one specific approach is discussed in greater detail below in conjunction with FIGS. 3A-5. In one embodiment, each node within the wireless mesh network 102 implements similar functionality and each node may act as a source node, destination node or intermediate node.

In network system 100, the access point 150 is configured to communicate with at least one node within the wireless mesh network 102, such as intermediate node 130-4. Communication may include transmission of payload data, timing data, or any other technically relevant data between the access point 150 and the at least one node within the wireless mesh network 102. For example, communications link 140 may be established between the access point 150 and intermediate node 130-4 to facilitate transmission of payload data between wireless mesh network 102 and network 152. The network 152 is coupled to the server 154 via communications link 142. The access point 150 is coupled to the network 152, which may comprise any wired, optical, wireless, or hybrid network configured to transmit payload data between the access point 150 and the server 154.

In one embodiment, the server 154 represents a destination for payload data originating within the wireless mesh network 102 and a source of payload data destined for one or more nodes within the wireless mesh network 102. In one embodiment, the server 154 is a computing device, including a processor and memory, and executes an application for interacting with nodes within the wireless mesh network 102. For example, nodes within the wireless mesh network 102 may perform measurements to generate measurement data, such as power consumption data. The server 154 may execute an application to collect the measurement data and report the measurement data. In one embodiment, the server 154 queries nodes within the wireless mesh network 102 for certain data. Each queried node replies with requested data, such as consumption data, system status and health data, and so forth. In an alternative embodiment, each node within the wireless mesh network 102 autonomously reports certain data, which is collected by the server 154 as the data becomes available via autonomous reporting.

The techniques described herein are sufficiently flexible to be utilized within any technically feasible network environment including, without limitation, a wide-area network (WAN) or a local-area network (LAN). Moreover, multiple network types may exist within a given network system 100. For example, communications between two nodes 130 or between a node 130 and the corresponding access point 150 may be via a radio-frequency local-area network (RF LAN), while communications between access points 150 and the network may be via a WAN such as a general packet radio service (GPRS). As mentioned above, each node within wireless mesh network 102 includes a network interface that enables the node to communicate wirelessly with other nodes. Each node 130 may implement any and all embodiments of the invention by operation of the network interface.

An exemplary network interface is described below in conjunction with FIG. 2.

Figure 2:
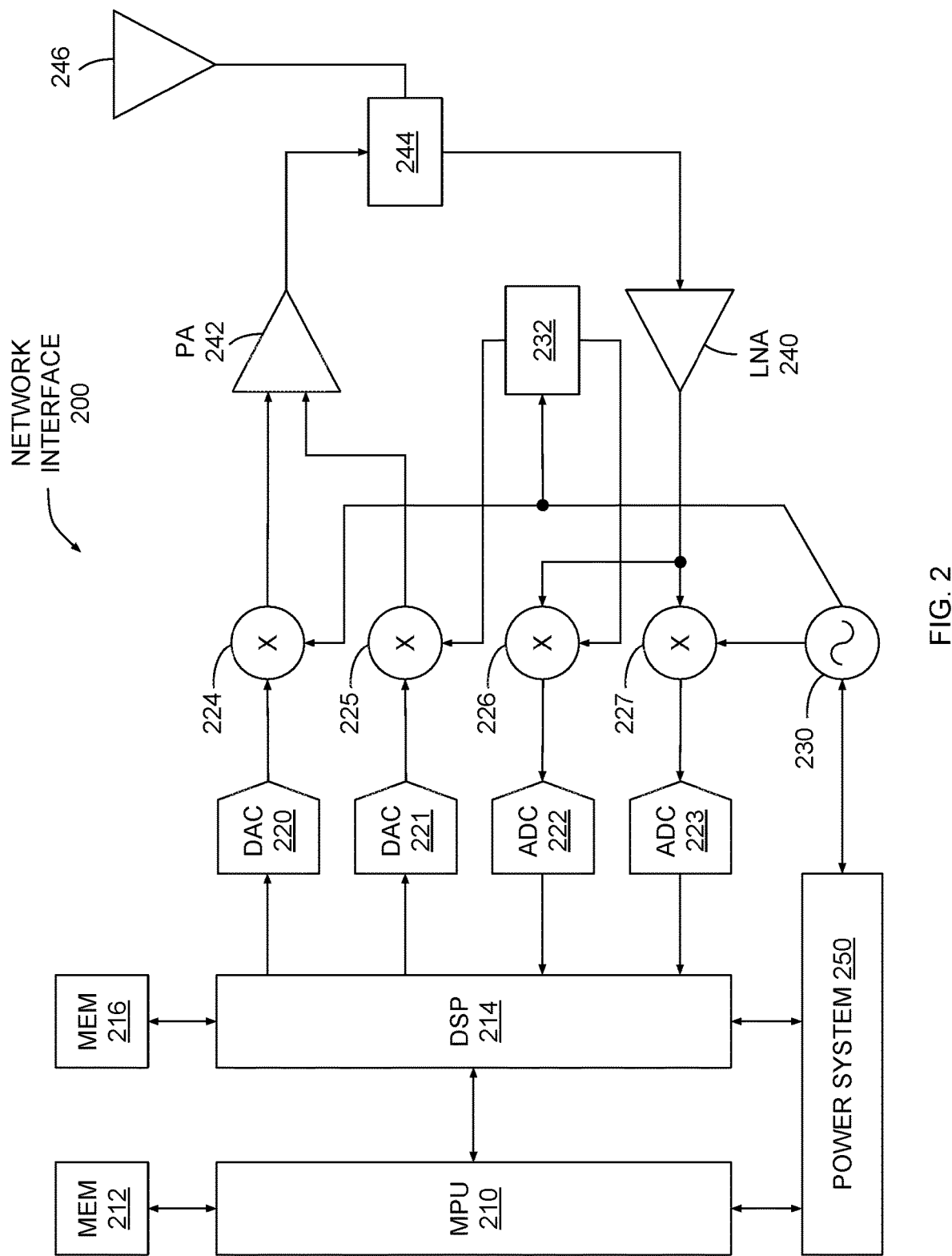
FIG. 2 illustrates a network interface configured to transmit and receive data within the mesh network of FIG. 1, according to various embodiments of the present invention.

FIG. 2 illustrates a network interface configured to transmit and receive data within the mesh network of FIG. 1, according to various embodiments of the present invention. Each node 110, 112, 130 within the wireless mesh network 102 of FIG. 1 includes at least a portion of the network interface 200. As shown, the network interface 200 includes, without limitation, a microprocessor unit (MPU) 210, a digital signal processor (DSP) 214, digital to analog converters (DACs) 220, 221, analog to digital converters (ADCs) 222, 223, analog mixers 224, 225, 226, 227, a phase shifter 232, an oscillator 230, a power amplifier (PA) 242, a low noise amplifier (LNA) 240, an antenna switch 244, an antenna 246, and a power system 250. Oscillator 230 may be coupled to a clock circuit (not shown) configured to maintain an estimate of the current time. MPU 210 may be configured to update this time estimate, and other data associated with that time estimate.

A memory 212 may be coupled to the MPU 210 for local program and data storage. Similarly, a memory 216 may be coupled to the DSP 214 for local program and data storage. Memory 212 and/or memory 216 may be used to buffer incoming data as well as store data structures such as, e.g., a forwarding database, and/or routing tables that include primary and secondary path information, path cost values, and so forth.

In one embodiment, the MPU 210 implements procedures for processing IP packets transmitted or received as payload data by the network interface 200. The procedures for processing the IP packets may include, without limitation, wireless routing, encryption, authentication, protocol translation, and routing between and among different wireless and wired network ports. In one embodiment, MPU 210 implements the techniques performed by the node when MPU 210 executes a firmware program stored in memory within network interface 200.

The MPU 214 is coupled to DAC 220 and DAC 221. Each DAC 220, 221 is configured to convert a stream of outbound digital values into a corresponding analog signal. The outbound digital values are computed by the signal processing procedures for modulating one or more channels. The DSP 214 is also coupled to ADC 222 and ADC 223. Each ADC 222, 223 is configured to sample and quantize an analog signal to generate a stream of inbound digital values. The inbound digital values are processed by the signal processing procedures to demodulate and extract payload data from the inbound digital values.

In one embodiment, MPU 210 and/or DSP 214 are configured to buffer incoming data within memory 212 and/or memory 216. The incoming data may be buffered in any technically feasible format, including, for example, raw soft bits from individual channels, demodulated bits, raw ADC samples, and so forth. MPU 210 and/or DSP 214 may buffer within memory 212 and/or memory 216 any portion of data received across the set of channels from which antenna 246 receives data, including all such data. MPU 210 and/or DSP 214 may then perform various operations with the buffered data, including demodulation operations, decoding operations, and so forth.

MPU 210, DSP 214, and potentially other elements included in network interface 200 are powered by power system 250. Power system 250 includes a higher voltage primary cell, such as a Lithium Thionyl Chloride (LTC) battery, and a lower voltage secondary cell, such as a Lithium Ion (Li-ion) battery. Power system 250 also includes a battery controller that buffers charge provided by the primary cell in order to charge the secondary cell. The secondary cell then delivers low voltage power that can safely power MPU 210, DSP 214, and other elements of network interface 200. Power system 250 is described in greater detail below in conjunction with FIGS. 3-4. At least one advantage of the battery controller mentioned above is that LTC batteries can be used to power nodes of wireless mesh network 102, thereby extending the operational lifetime of those nodes.

Persons having ordinary skill in the art will recognize that network interface 200 represents just one possible network interface that may be implemented within wireless mesh network 102 shown in FIG. 1, and that any other technically feasible device for transmitting and receiving data may be incorporated within any of the nodes within wireless mesh network 102.

Safeguarding Lower Voltage Integrated Circuits

Figure 3:
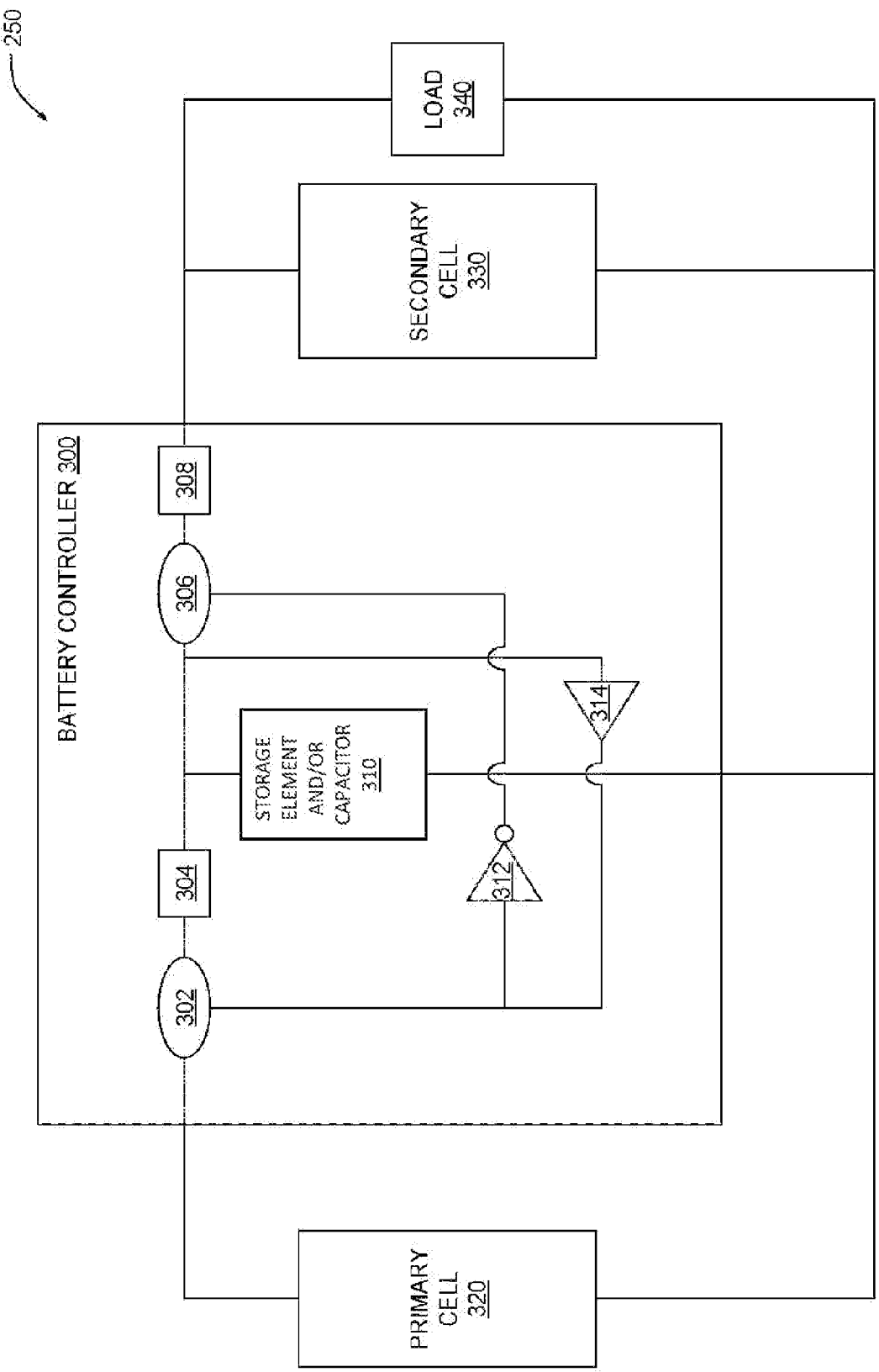
FIG. 3 is a more detailed illustration of the power system of FIG. 2, according to various embodiments of the present invention.

FIG. 3 is a more detailed illustration of the power system of FIG. 2, according to various embodiments of the present invention. As shown, power system 250 includes a battery controller 300 coupled between a primary cell 320 and a secondary cell 330. Secondary cell 300 powers a load 340. Primary cell 320 may be an LTC battery. Primary cell 320 may deliver charge at greater than 3.6 Volts. Secondary cell 330 may be an Li-ion battery. Load 340 may include some or all elements included in network interface 200 of FIG. 2. The maximum operating voltage of load 340 may be less than 3.6 Volts.

Battery controller 300 includes switches 302 and 306, current limiters 304 and 308, storage element 310, inverter 312, and comparator 314, coupled together in the manner shown. Current limiters 304 and 308 may protect primary cell 320 and secondary cell 330 from current spikes by preventing inrush current to and from storage element 310. Storage element 310 may be a capacitor. Comparator 314 monitors a voltage level associated with storage element 310. Comparator 314 may have hysteresis and may operate relative to a reference.

In operation, primary cell 320 powers storage element 310 via switch 302, which initially may be closed. Comparator 314 monitors voltage associated with storage element 310. When storage element 310 reaches a voltage level that is higher than a target operating voltage of secondary cell 330, comparator 314 transmits a signal to open switch 302. Inverter 312 inverts that signal and closes switch 306. Configured in this manner, primary cell 320 is isolated from secondary cell 330.

With switch 306 closed, storage element 310 conducts stored charge through switch 306 and into secondary cell 330, thereby charging secondary cell 330. Storage element 310 continues to conduct stored charge in this manner, thereby causing the voltage level associated with storage element 310 to decrease. Comparator 314 continues to monitor this voltage level. When the voltage level of storage element 310 is less than (or equal to) the target operating voltage of secondary cell 330, comparator 314 transmits a signal to close switch 302. Inverter 312 inverts this signal, thereby opening switch 306. Primary cell 320 may then again charge storage element 310.

This process may repeat continuously, and during this process secondary cell 330 provides power to load 340. When the voltage of secondary cell 330 reaches the operating voltage of load 340, comparator 314 keeps switch 302 closed until the voltage of secondary cell 330 falls beneath the target operating voltage of secondary cell 330. Then, comparator 314 opens switch 302, causing inverter 312 to close switch 306 and allow secondary cell 330 to recharge via storage cell 310.

Battery controller 300 described above advantageously allows a higher voltage battery to safely power a load that demands a lower voltage. Because higher voltage batteries may have an extended lifetime compared to other lower batteries, a battery-powered node that implements battery controller 300 may have a longer operational lifetime compared to other devices that can only be powered by lower voltage batteries. In addition, battery controller 300 may mitigate voltage variations in higher voltage batteries that can occur due to temperature fluctuations. In particular, certain types of LTC batteries provide a voltage level that decreases with increasing temperature. The buffering approach implemented by battery controller 300 reduces the effects of these voltage changes. Further, battery controller 300 may be especially advantageous when implemented in wireless mesh networks where battery-powered nodes power on periodically and need an elevated current level over a short time span. Because higher voltage batteries often have high impedance levels, such batteries usually cannot quickly provide an elevated current level. However, battery controller 300 allows a high current level to be provided to load 340 via secondary cell 330 independent of the impedance level of primary cell 320. Finally, battery controller 300 described thus far operates with low quiescent current and can be constructed at low cost. For these reasons, battery controller 300 represents a significant technological improvement.

Figure 4:
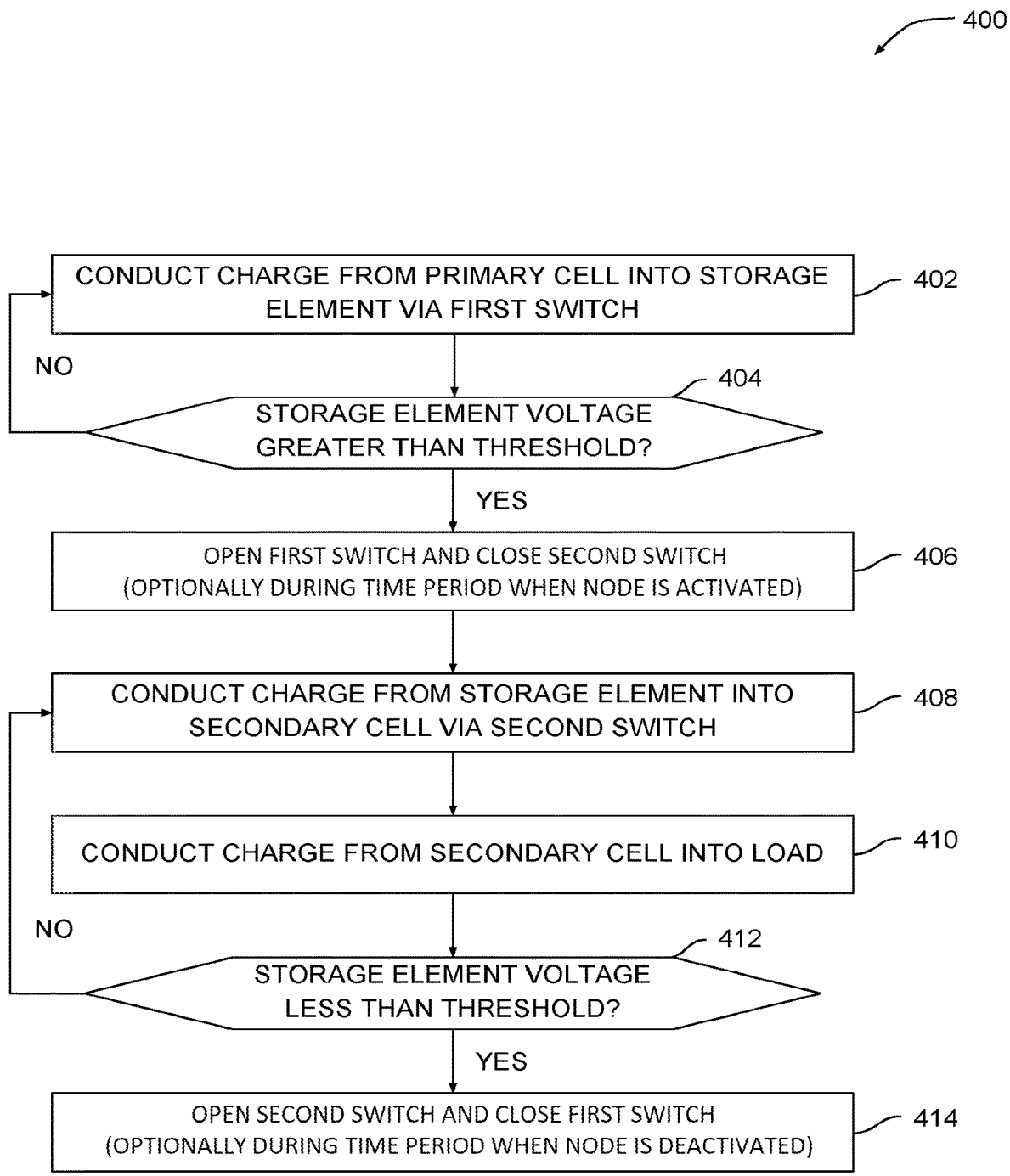
FIG. 4 is a flow diagram of method steps for controlling power delivered by a battery within a battery-powered node, according to various embodiments of the present invention.

FIG. 4 is a flow diagram of method steps for controlling power delivered by a battery within a battery-powered node, according to various embodiments of the present invention. Although the method steps are described in conjunction with the systems of FIGS. 1-3, persons skilled in the art will understand that any system configured to perform the method steps, in any order, is within the scope of the present invention.

As shown, a method 400 begins at step 402, where battery controller 300 conducts charge from primary cell 320 into storage element 310 via switch 302, thereby storing electrical energy in storage element 310. At step 404, comparator 314 within battery controller 300 determines whether the voltage of storage element 310 is greater than a threshold. The threshold generally corresponds to the target operating voltage of secondary cell 330. The method 400 returns to step 402 until the voltage of storage element 310 exceeds the threshold.

When the voltage of storage element 310 exceeds the threshold, the method 400 proceeds to step 406. At step 406, comparator 314 opens switch 302 and inverter 312 closes switch 306. At step 408, storage element 310 conducts charge into secondary cell 330 via switch 306, thereby storing electrical energy in secondary cell 330. At step 410, secondary cell 330 conducts electrical energy to load 340. As mentioned, load 340 may include various elements of network interface 200 of FIG. 2. Thus, when load 340 is supplied with electrical energy in this manner, network interface 200 may operate to perform network communications.

At step 412, comparator 314 within battery controller 300 determines whether the voltage of storage element 310 is less than the threshold. Again, the threshold generally corresponds to the target operating voltage of secondary cell 330. The method 400 returns to step 408 until the voltage of storage element 310 falls beneath the threshold. When the voltage of storage element 310 falls beneath the threshold, the method 400 proceeds to step 414. At step 414, comparator 314 opens switch 306 and inverter 312 closes switch 302. Battery controller 300 repeat the method 400 continuously in order buffer charge between primary cell 320 and secondary cell 330.

In sum, a battery controller buffers a higher voltage provided by a primary cell in order to charge a secondary cell. The secondary cell provides a low voltage that can safely power integrated circuitry within a battery powered node with limited risk of damage. The battery controller includes a storage device that is charged by the primary cell. When the voltage of the storage device reaches a threshold, the battery controller conducts the stored charge into the secondary cell while isolating the secondary cell from the primary cell. The secondary cell, when charged, powers the battery powered node at the low voltage.

One advantage of the techniques described herein is that a higher voltage LTC battery can safely provide power to a node that has a low maximum operating voltage. Accordingly, the node may operate for extended periods of time compared to conventional nodes powered only by lower voltage batteries. Extending the operational life of battery-powered nodes that participate in wireless mesh networks is critical to the ongoing operation of those networks. Another advantage of the techniques described herein is that the primary cell is not required to quickly provide an elevated current level when the node reactivates because the secondary cell provides this current level. Thus, the node can very briefly reactivate to perform network communications, thereby conserving power. For at least these reasons, the techniques described herein represent a technological advancement over previous approaches.

1. A computer-implemented method for powering a battery-powered node residing within a wireless mesh network, the method comprising: storing first electrical energy in a storage element, wherein a primary cell transmits the first electrical energy to the storage element at a first voltage level, determining that a second voltage level associated with the storage element exceeds a third voltage level associated with a secondary cell, and storing second electrical energy that is derived from the first electrical energy in the secondary cell, wherein the battery-powered node communicates with one or more other nodes residing within the wireless mesh network using at least a portion of the second electrical energy.

2. The computer-implemented method of clause 1, wherein storing the first electrical energy comprises causing one or more switches to switch into a first configuration, and wherein, in the first configuration, the primary cell is electrically coupled to the storage element and electrically isolated from the secondary cell.

3. The computer-implemented method of any of clauses 1 and 2, wherein the one or more switches includes a first switch and a second switch, and wherein, in the first configuration, the first switch is closed and the second switch is open.

4. The computer-implemented method of any of clauses 1, 2, and 3, wherein storing the second electrical energy comprises causing one or more switches to switch into a second configuration, and wherein, in the second configuration, the secondary cell is electrically coupled to the storage element and electrically isolated from the primary cell.

5. The computer-implemented method of any of clauses 1, 2, 3, and 4, wherein the one or more switches includes a first switch and a second switch, and wherein, in the second configuration, the first switch is open and the second switch is closed.

6. The computer-implemented method of any of clauses 1, 2, 3, 4, and 5, wherein the first voltage level is greater than a maximum voltage level associated with the battery-powered node, and the second voltage level is less than or equal to the maximum voltage level associated with the battery-powered node.

7. The computer-implemented method of any of clauses 1, 2, 3, 4, 5, and 6, wherein the primary cell comprises a lithium thionyl chloride battery, and the first voltage level is greater than 3.6 volts.

8. The computer-implemented method of any of clauses 1, 2, 3, 4, 5, 6, and 7, wherein the secondary cell comprises a lithium ion battery, and the third voltage level is less than or equal to 3.6 volts.

9. The computer-implemented method of any of clauses 1, 2, 3, 4, 5, 6, 7, and 8, wherein the storage element comprises a capacitor.

10. The computer-implemented method of any of clauses 1, 2, 3, 4, 5, 6, 7, 8, and 9, wherein the node draws the second electrical energy from the secondary cell when performing the wireless communications with a current level that is independent of an impedance level associated with the primary cell.

11. A system for powering a battery-powered node residing within a wireless mesh network, comprising: a storage element that stores first electrical energy, a primary cell that transmits the first electrical energy to the storage element at a first voltage level, a comparator that determines that a second voltage level associated with the storage element exceeds a third voltage level, and a secondary cell that operate at the first voltage level and stores second electrical energy that is derived from the first electrical energy, wherein the battery-powered node communicates with one or more other nodes residing within the wireless mesh network using at least a portion of the second electrical energy.

12. The system of clause 11, wherein the storage element stores the first electrical energy when the comparator causes one or more switches to switch into a first configuration, and wherein, in the first configuration, the primary cell is electrically coupled to the storage element and electrically isolated from the secondary cell.

13. The system of any of clauses 11 and 12, wherein the one or more switches includes a first switch and a second switch, and wherein, in the first configuration, the first switch is closed and the second switch is open.

14. The system of any of clauses 11, 12, and 13, wherein the secondary cell stores the second electrical energy when the comparator causes one or more switches to switch into a second configuration, and wherein, in the second configuration, the secondary cell is electrically coupled to the storage element and electrically isolated from the primary cell.

15. The system of any of clauses 11, 12, 13, and 14, wherein the one or more switches includes a first switch and a second switch, and wherein, in the second configuration, the first switch is open and the second switch is closed.

16. The system of any of clauses 11, 12, 13, 14, and 15, wherein the first voltage level is greater than a maximum voltage level associated with the battery-powered node, and the second voltage level is less than or equal to the maximum voltage level associated with the battery-powered node.

17. The system of any of clauses 11, 12, 13, 14, 15, and 16, wherein the primary cell comprises a lithium thionyl chloride battery and the first voltage level is greater than 3.6 volts, and wherein the secondary cell comprises a lithium ion battery and the third voltage level is less than or equal to 3.6 volts.

18. The system of any of clauses 11, 12, 13, 14, 15, 16, and 17, wherein the battery powered node deactivates during a first recurring time period and reactivates during a second recurring time period to communicate with the one or more other nodes.

19. The system of any of clauses 11, 12, 13, 14, 15, 16, 17, and 18, wherein the first time period exceeds the second time period.

20. The system of any of clauses 11, 12, 13, 14, 15, 16, 17, 18, and 19, wherein the battery-powered node draws the second electrical energy from the secondary cell when communicating with the one or more other nodes at a current level that is independent of an impedance level associated with the primary cell.

Any and all combinations of any of the claim elements recited in any of the claims and/or any elements described in this application, in any fashion, fall within the contemplated scope of the present invention and protection The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for powering a battery-powered node residing within a wireless mesh network, the method comprising:
   storing first electrical energy in a storage element, wherein a primary cell transmits the first electrical energy to the storage element at a first voltage level, wherein the primary cell transmits the first electrical energy at a first initial current level;
   determining that a second voltage level associated with the storage element exceeds a third voltage level associated with a secondary cell, wherein the first voltage level at which the primary cell transmits the first electrical energy to the storage element is greater than the third voltage level associated with the secondary cell; and
   storing second electrical energy that is derived from the first electrical energy in the secondary cell, wherein the battery-powered node communicates with one or more other nodes residing within the wireless mesh network using at least a portion of the second electrical energy that is transmitted from the secondary cell to power a load, wherein the secondary cell transmits the at least a portion of the second electrical energy at a second initial current level that is greater than the first initial current level.

2. The computer-implemented method of claim 1, wherein the first voltage level is greater than a maximum voltage level associated with the battery-powered node, and the second voltage level is less than or equal to the maximum voltage level associated with the battery-powered node.

3. The computer-implemented method of claim 1, wherein the primary cell comprises a lithium thionyl chloride battery, and the first voltage level is greater than 3.6 volts.

4. The computer-implemented method of claim 1, wherein the secondary cell comprises a lithium ion battery, and the third voltage level is less than or equal to 3.6 volts.

5. The computer-implemented method of claim 1, wherein the storage element comprises a capacitor.

6. The computer-implemented method of claim 1, wherein the node draws the second electrical energy from the secondary cell when performing the wireless communications with a current level that is independent of the first impedance level associated with the primary cell.

7. The computer-implemented method of claim 1, wherein the primary cell comprises a lithium thionyl chloride battery operating at the first voltage level and transmitting the first electrical energy at the first initial current level, and the secondary cell comprises a lithium ion battery operating at the third voltage level and transmitting the at least a portion of the second electrical energy at the second initial current level.

8. The computer-implemented method of claim 1, wherein storing the first electrical energy comprises causing one or more switches to switch into a first configuration, and wherein, in the first configuration, the primary cell is electrically coupled to the storage element and electrically isolated from the secondary cell.

9. The computer-implemented method of claim 8, wherein the one or more switches includes a first switch and a second switch, and wherein, in the first configuration, the first switch is closed and the second switch is open.

10. The computer-implemented method of claim 1, wherein storing the second electrical energy comprises causing one or more switches to switch into a first configuration, and wherein, in the first configuration, the secondary cell is electrically coupled to the storage element and electrically isolated from the primary cell.

11. The computer-implemented method of claim 10, wherein the one or more switches includes a first switch and a second switch, and wherein, in the first configuration, the first switch is open and the second switch is closed.

12. A system for powering a battery-powered node residing within a wireless mesh network, comprising:
   a storage element that stores first electrical energy;
   a primary cell that transmits the first electrical energy to the storage element at a first voltage level, wherein the primary cell transmits the first electrical energy at a first initial current level;
   a comparator that determines that a second voltage level associated with the storage element exceeds a third voltage level, wherein the first voltage level at which the primary cell transmits the first electrical energy to the storage element is greater than the third voltage level associated with the secondary cell; and
   a secondary cell that operates at the third voltage level and stores second electrical energy that is derived from the first electrical energy, wherein the battery-powered node communicates with one or more other nodes residing within the wireless mesh network using at least a portion of the second electrical energy that is transmitted from the secondary cell to power a load, wherein the secondary cell transmits the at least a portion of the second electrical energy at a second initial current level that is greater than the first initial current level.

13. The system of claim 12, wherein the first voltage level is greater than a maximum voltage level associated with the battery-powered node, and the second voltage level is less than or equal to the maximum voltage level associated with the battery-powered node.

14. The system of claim 12, wherein the primary cell comprises a lithium thionyl chloride battery and the first voltage level is greater than 3.6 volts, and wherein the secondary cell comprises a lithium ion battery and the third voltage level is less than or equal to 3.6 volts.

15. The system of claim 12, wherein the battery-powered node draws the second electrical energy from the secondary cell when communicating with the one or more other nodes at a current level that is independent of the first impedance level associated with the primary cell.

16. The system of claim 12, wherein the storage element stores the first electrical energy when the comparator causes one or more switches to switch into a first configuration, and wherein, in the first configuration, the primary cell is electrically coupled to the storage element and electrically isolated from the secondary cell.

17. The system of claim 16, wherein the one or more switches includes a first switch and a second switch, and wherein, in the first configuration, the first switch is closed and the second switch is open.

18. The system of claim 12, wherein the secondary cell stores the second electrical energy when the comparator causes one or more switches to switch into a first configuration, and wherein, in the first configuration, the secondary cell is electrically coupled to the storage element and electrically isolated from the primary cell.

19. The system of claim 18, wherein the one or more switches includes a first switch and a second switch, and wherein, in the first configuration, the first switch is open and the second switch is closed.

20. The system of claim 12, wherein the battery powered node deactivates during a first recurring time period and reactivates during a second recurring time period to communicate with the one or more other nodes.

21. The system of claim 20, wherein the first time period exceeds the second time period.

* * * * *